United States Patent Office 3,049,009
Patented Aug. 14, 1962

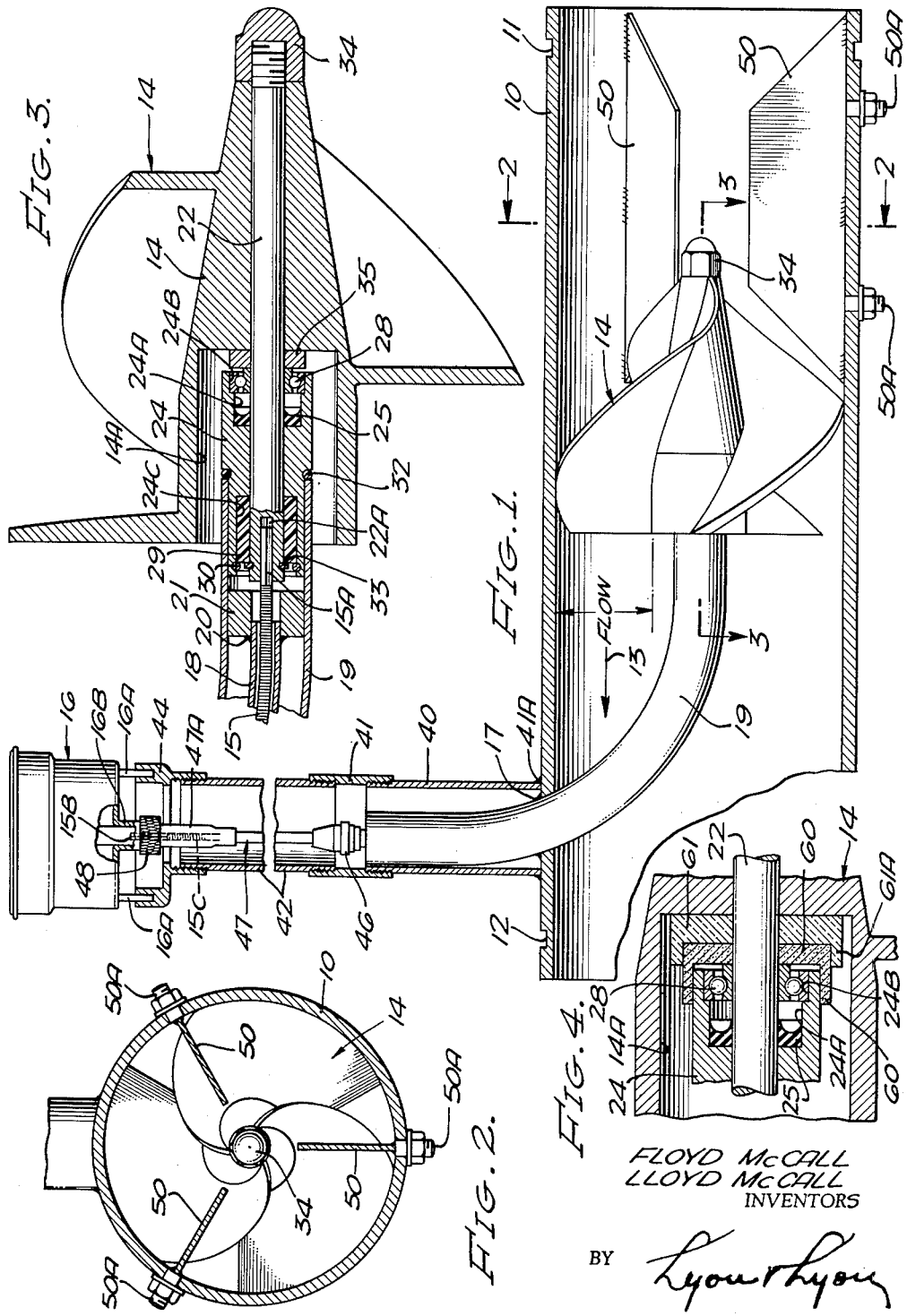

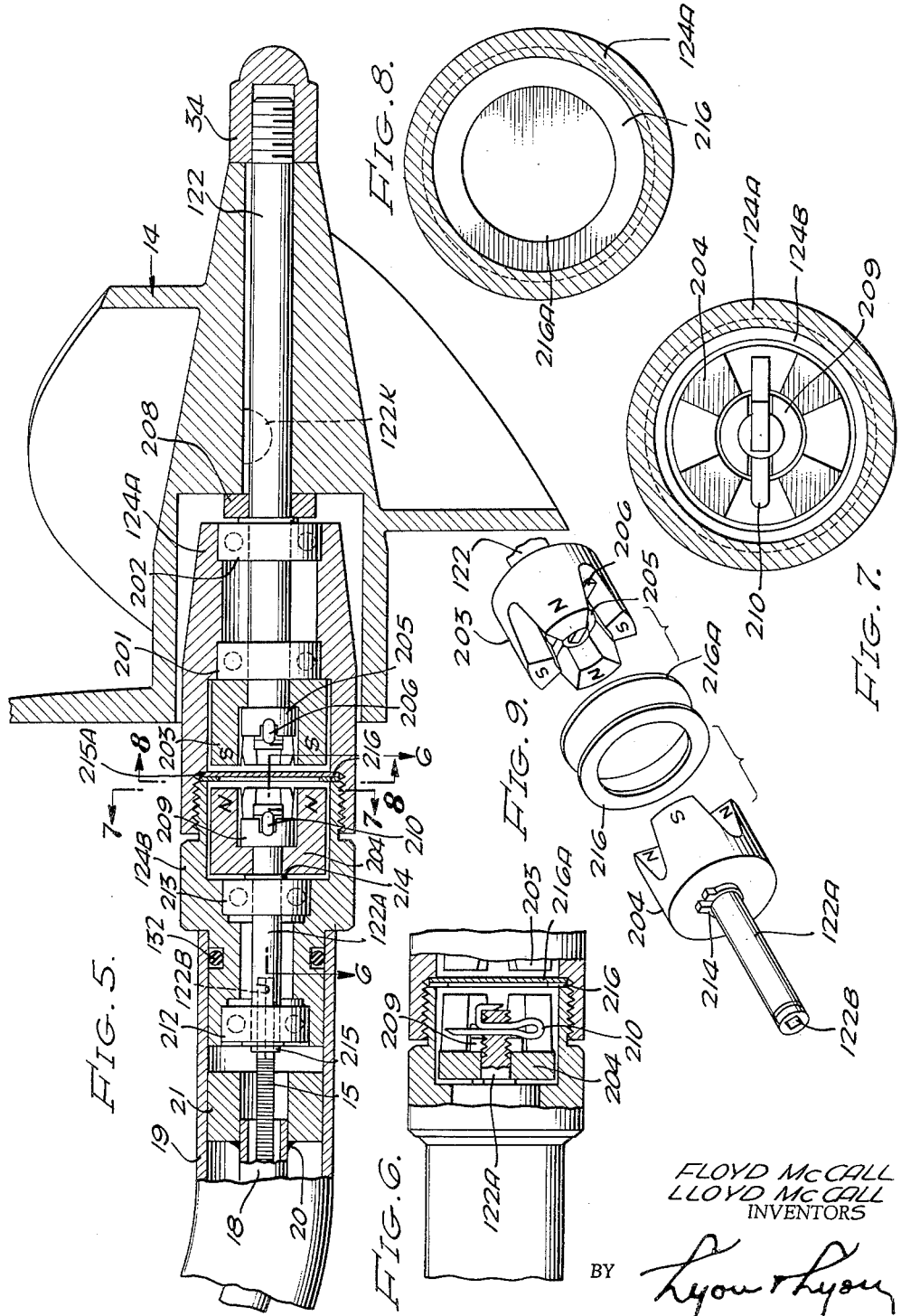

3,049,009
FLOW METER
Floyd McCall, Rte. 1, Box 188, and Lloyd McCall,
Rte. 1, Box 91, both of Romoland, Calif.
Filed Nov. 10, 1958, Ser. No. 772,756
1 Claim. (Cl. 73—231)

The present invention relates to flow meters and particularly one for measuring the quantity of water flow in conduits.

An object of the present invention is to provide an improved arrangement for measuring quantities of water flow which is relatively simple while yet accurate.

Another object of the present invention is to provide an improved arrangement of this character in which the totalizing meter itself may be easily removed and again assembled for purposes of checking accuracy, servicing and installation.

Another object of the present invention is to provide an arrangement of this character in which the totalizing meter itself need not be placed in the flow line but indeed may be placed flush with the ground or elevated above the ground.

Another object of the present invention is to provide an arrangement of this character which uses an impeller which in cross section, occupies substantially the entire cross sectional area of the conduit in which it is placed for achieving accurate determinations.

Another object of the present invention is to provide an improved arrangement of this character which is streamlined so that the normal flow which would otherwise occur through the conduit is not disturbed appreciably whereby more accurate determinations may be obtained not only for flow of water with constant velocity but with flows of changing velocity.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

FIGURE 1 illustrates generally in cross section an improved arrangement embodying features of the present invention;

FIGURES 2 and 3 are sectional views taken substantially on the lines 2—2 and 3—3 in FIGURE 1; and FIGURE 4 illustrates a modified arrangement.

FIGURES 5–9 illustrate another arrangement for determining fluid flow using magnetic coupling, FIGURE 5 being a longitudinal sectional view and FIGURES 6, 7 and 8 being sectional views taken along correspondingly designated lines in FIGURE 5 while FIGURE 9 is a perspective view illustrating the magnetic coupling elements shown in FIGURES 5–8.

The purpose of the arrangement is to measure and indicate the total quantity of water passing through the conduit 10 which is suitably adapted by means of grooves 11 and 12 near the ends thereof for connection in a water line with the flow of water being in the direction indicated by the arrow 13.

A streamlined impeller 14 is rotatably mounted within the conduit 10, the impeller 14 being of such size and shape that its angular movement is directly proportional to the velocity of the water flow 13. This angular movement of the impeller 14 is transferred by the flexible cable 15 to an integrating meter 16 of generally conventional construction which indicates visually the numeric quantity of the water which has flown through the conduit 10. It is noted that using this construction the upper edges of the meter 16 may be placed either flush with the ground, below the ground or in some cases above the ground level as desired.

For these purposes the impeller 14 is rotatably mounted on a streamlined supporting tube 19 which, as shown in FIGURE 1, is generally in the form of a right angle tube or elbow which is welded at 17 along its periphery to the adjacent apertured portion of the conduit 10 through which the tube 19 extends to thereby assure a watertight connection at 17. The flexible cable 15 and its outer guide sheath 18 is within the tube 19 and extends substantially the full length of the supporting tube 19. The sheath 18 is welded at 20 to a collar 21 which is fitted within the supporting tube 19 such that the square end 15A of the flexible cable 15 as shown in FIGURE 3 projects outwardly from such collar 21. This square end 15A of the flexible cable 15 is releasably fitted in the oversize square apertured portion 22A of the impeller shaft 22. The impeller shaft 22 is rotatably supported in the bearing retaining busing 24. This bushing 24 at its forward end has a relatively small counterbore 24A within which a seal 25 is placed for minimizing any tendency of the water to flow between the shaft 22 and the bushing 24; also the forward end of the bushing 24 has a relatively large counterbore 24B within which the outer race of the ball thrust bearing 28 is press-fitted. The bushing 24 is also counterbored at 24C to receive an annular sleeve 29 of material such as, for example, Teflon, leather or other plastic materials so as to provide a combined bearing and seal for the shaft 22. This sleeve 29 is retained in the bushing 24 by a retaining ring 30 which is recessed within an annular groove in the bushing 24. The bushing 24 itself is press-fitted within the supporting tube 19 with a sealing O-ring 32 between the two. A retaining ring 33 recessed within the shaft 22 also contacts the sleeve 29 when the impeller 14 is assembled.

The impeller 14 is releasably retained on the shaft 22 by a streamlined nut 34 which is threaded on the end of shaft 22. A thrust washer 35 is placed between the inner race of the thrust bearing 24B and an inner annular wall of the impeller 14. It is noted that the impeller 14 has a relatively large and long counterbore 14A within which the major portion of the bearing retaining bushing 24 is housed so as to achieve a streamlined effect and to minimize leakage.

The upper end of the supporting tube 19 is housed within a pipe section 40 which is welded at 41A along its periphery to the outer wall of the conduit 10, and the upper end of this pipe section 40 is threaded to receive the pipe coupling 41. The upper pipe section 42 which is also threaded in the coupling 41 may be of different lengths as desired, depending upon the desired location of the totalizing meter 16. The upper end of this pipe section 42 has threaded thereon a flange member 44 which is suitably bored to releasably receive the circumferentially spaced supporting legs 16A of the housing of meter 16.

The meter 16 may be generally in the form of a Veeder root counter which is adapted to be driven by the flexible cable 15.

The cable 15 and its sheath 18 are interconnected in conventional manner at 46 to one end of the flexible cable assembly 47; and the upper end of such section 47 is releasably secured to the meter 16. For this latter purpose the outer sheath 47A of the section 47 is releasably secured to the threaded fitting 16B of the meter 16 using the knurled nut 48 with the square end 15B of the inner cable 15C releasably engaging an oversized square driving shaft of the meter 16.

It is evident from this construction that the meter 16 may be conveniently removed by loosening the knurled nut 48 and then lifting the meter 16 upwardly out of engagement with the flange 44 and the square end 15B of the driving cable.

One feature of the instant invention is that the impeller 14 is subjected to a laminar flow of water, this being assured by the three vanes 50 in the form of trapezoidal plates which are equally spaced circumferentially so as to extend radially inwardly as shown in FIGURE 2, such plates being secured to the wall 10 by stud bolts 50A welded to each of the plates 50. Additionally, the plates 50 may be welded to the inner wall of the conduit 10 along the contacting edge of the plate 50.

It will be noted also from this construction that the driving cable 15 may be easily replaced and serviced as required once the meter 16 is removed as described above. In such case the cable 15 may be pulled out of its sheath because of the releasable connection provided between the square end 15A of the cable and the shaft 22 and thereafter a new cable 15 may be threaded into operative position.

While FIGURE 3 shows a thrust washer between the impeller 14 and the inner race of the thrust bearing 28, the same may be replaced as shown in FIGURE 4 by an arrangement which assures a better seal. In such case the washer 35 is replaced by the two elements 60 and 61 in FIGURE 4. The element 61 which abuts the wall of the impeller 14 comprises generally an apertured disk of Fiberglas having a lip portion 61A which partially embraces the similarly shaped sealing member 60 of smaller diameter. The element 60 which abuts the inner race of the thrust bearing 28 is of material generally used as gasket material and has a lip portion 60A snugly fitting around the element 24. It will be observed that these elements 60 and 61 are pressed together when the nut 34 is tightened to tighten the impeller 14 on its shaft 22.

While the meter 16 is described above as an integrating meter for visually indicating quantity of flow, the same, if desired, may be one which indicates instantaneous values of shaft rotation, i.e. instantaneous flow velocities.

The arrangement shown in FIGURES 5–9 is intended to be operatively connected to a totalizing device 16 in the manner illustrated in FIGURE 1 and accordingly corresponding parts have identical reference numerals in FIGURES 1 and 5.

In FIGURE 5, the vane 14 is keyed on shaft 122 by key 122K and retained by the special form of nut 34 on shaft 122. Shaft 122 is rotatably supported in the spaced ball bearings 201, 202, each of which has its outer race member press-fitted into opposite sides respectively of the internally threaded supporting bushing member 124A. This bushing member 124A is threaded on the other bushing member 124B which is press-fitted into the open end of the supporting tube 19 with an O-ring seal 132 between the tube 19 and bushing member 124B. It is noted that while FIGURE 1 incorporates a single bushing 24, FIGURE 5 incorporates a similar split bushing comprising the two threaded parts 124A, 124B which serve to house the magnetic structures 203 and 204 respectively, each generally of the same configuration and cooperating with each other to form a magnetic coupling.

The magnetic structure 203 is centrally apertured to receive shaft 122 and shaped and magnetized to have alternate north and south poles along its periphery as indicated by the corresponding letters N and S in FIGURES 9 and 5. The magnetic structure 203 is retained on shaft 122 by a special form of castellated nut 205 and cotter pin 206, in the manner illustrated in FIGURE 6, so that such structure 203 rotates with the vane 14. To assure easy rotation of the vane 14 a stainless steel spacer ring 208 is positioned between the vane 14 and the inner race member of bearing 202.

In similar manner, the other matching magnetic structure 204 is secured on shaft 122A for rotation therewith using a similar castellated nut 209 and cotter pin 210 (FIGURE 6).

This shaft 122A is journalled for rotation in the spaced shielded bearings 212, 213 each of which has its outer race member press-fitted into opposite ends of the bushing member 124B. Such shaft 122A has two spaced annular grooved portions into which are disposed the split resilient retaining washers 214 and 215 for retaining such shaft 122A. These washers 214, 215 abut the inner race members only of bearings 213 and 212 respectively to assure free rotation of the shaft 122A in these bearings.

The shaft 122A as shown in FIGURE 9 has a square apertured portion 122B in one end thereof to provide a releasable connection with one end of the flexible cable element 15 in the manner described also in connection with FIGURE 1.

Prior to threading the two bushing elements 124A and 124B together, a non-magnetic stainless steel or brass disc 216A and non-magnetic gasket ring 216 (FIGURE 9) is interposed between these elements and sandwiched between the same for purposes of providing a seal. The bushing elements 124A, 124B are likewise of non-magnetic material such as brass.

In operation, it will thus be seen that rotation of the vane 14 imparted by a fluid stream produces synchronous rotation of shaft 122A and cable shaft 15 through the magnetic coupling comprising cooperating magnetic structures 203, 204, each of which are permanent magnets polarized as indicated in FIGURES 5 and 9.

The spacing between such structures 203, 204 is approximately three sixteenths of an inch ($3/16''$) and such structures orient themselves and maintain an orientation such that the north pole of one of such structures is adjacent the south pole of the other structure.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

We claim:

A flow meter arrangement comprising, a circular conduit through which fluid flows, an impeller having an outside diameter substantially equal to the inner diameter of said conduit and having a projected area in a plane corresponding to the diameter of the impeller which is substantially equal to the cross-sectional area of said conduit, said impeller being rotatably mounted in said conduit with its axis extending generally parallel to the axis of said conduit, a sole support for said impeller comprising a right-angle tubular elbow having a first portion within said conduit and extending parallel with said axis, said tubular elbow having a second portion extending through the wall of said conduit, a collar mounted in said first portion, a cable assembly comprising a flexible cable and a sheath, said sheath having one of its ends secured to said collar with said cable extending through said collar, said cable assembly being within said tubular elbow, bearing-retaining means comprising first and second interthreaded bushings mounted on said first portion, each of said bushings including bearing means, a first impeller shaft mounting said impeller and extending axially therefrom and being rotatably supported in said bearing means in said first bushing, a first annular magnet being mounted coaxially on one end of said impeller shaft within said first bushing, first fastening means releasably securing said first magnet on said one end of said impeller shaft, releasable means on the other end of said impeller shaft securing said impeller on said impeller shaft, a second shaft rotatably supported in said bearing means in said second bushing, means on one end of said second shaft for releasably coupling the same to one end of said cable, a second annular magnet mounted coaxially on said second shaft within said second bushing, second releasable fastening means securing said second magnet on the other end of said second shaft, said first and second magnets cooperating magnetically to provide a magnetic drive between said second shaft and said first impeller shaft, washer means mounted on one of said shafts between one of said magnets and one of said bushings for establishing the spacing between said magnets, said first and second bushings being interthreaded near said spacing such that when one of said bushings is threaded out of the other bushing access is had to said first and second fastening means, a meter having a driving shaft, and means releasably securing the other end of said cable to said meter driving shaft.

References Cited in the file of this patent

UNITED STATES PATENTS

| | | |
|---|---|---|
| 1,230,225 | Robertson | June 19, 1917 |
| 1,425,936 | Bailey | Aug. 15, 1922 |
| 1,609,229 | Walker et al. | Nov. 30, 1926 |
| 2,371,511 | Faus | Mar. 13, 1945 |
| 2,633,745 | Reis | Apr. 7, 1953 |
| 2,770,131 | Sparling | Nov. 13, 1956 |
| 2,773,383 | Kersten | Dec. 11, 1956 |

FOREIGN PATENTS

| | | |
|---|---|---|
| 800,668 | France | May 4, 1936 |
| 159,361 | Sweden | June 25, 1957 |